(12) United States Patent
Li et al.

(10) Patent No.: US 12,092,327 B2
(45) Date of Patent: Sep. 17, 2024

(54) ONLINE PULVERIZED COAL CONCENTRATION REGULATOR AND REGULATING METHOD

(71) Applicant: Wei Li, Sichuan (CN)

(72) Inventors: Wei Li, Sichuan (CN); Cenwenda Li, Sichuan (CN); Qi Zhang, Sichuan (CN)

(73) Assignee: Wei Li, Sichuan (CN)

( * ) Notice: Subject to any disclaimer, the term of this patent is extended or adjusted under 35 U.S.C. 154(b) by 638 days.

(21) Appl. No.: 17/426,534

(22) PCT Filed: Aug. 21, 2020

(86) PCT No.: PCT/CN2020/110576
§ 371 (c)(1),
(2) Date: Jul. 28, 2021

(87) PCT Pub. No.: WO2022/021511
PCT Pub. Date: Feb. 3, 2022

(65) Prior Publication Data
US 2022/0146097 A1    May 12, 2022

(30) Foreign Application Priority Data

Jul. 30, 2020  (CN) .......................... 202010751133.8

(51) Int. Cl.
*F23N 1/02*     (2006.01)
*B01F 23/00*   (2022.01)
(Continued)

(52) U.S. Cl.
CPC ............. *F23N 1/025* (2013.01); *B01F 23/02* (2022.01); *B01F 23/30* (2022.01); *F23K 3/02* (2013.01);
(Continued)

(58) Field of Classification Search
CPC ...... F23N 1/025; F23N 1/005; F23N 2239/02; F23N 2225/00; F23N 2237/04;
(Continued)

(56) References Cited

U.S. PATENT DOCUMENTS

2010/0034049 A1    2/2010 Ferr
2020/0061628 A1    2/2020 Bianca

FOREIGN PATENT DOCUMENTS

CN       2319694 Y    5/1999
CN     202962563 U    6/2013
(Continued)

*Primary Examiner* — Vivek K Shirsat
(74) *Attorney, Agent, or Firm* — Muncy, Geissler, Olds & Lowe, P.C.

(57) ABSTRACT

An online pulverized coal concentration regulator is mounted at a front end of a pulverized coal pipe, and a pulverized coal concentration detector is arranged in the pipe. The regulator includes a control system, and an output of the concentration detector is connected with a signal input end of the control system. The regulator includes a top plate, a regulating rod, and a powder baffle plate. A mounting hole for fixedly mounting the front end of the pipe and a through hole for the powder baffle plate to penetrate through are arranged in the top plate, and a connector is arranged between the regulating rod and the powder baffle plate. The regulator includes a guider slidably connected with the powder baffle plate and fixedly connected with the top plate, and a diversion plate arranged on the top plate and slidably connected with the powder baffle plate.

6 Claims, 3 Drawing Sheets

(51) Int. Cl.
*B01F 23/30* (2022.01)
*F23K 3/02* (2006.01)
*F23N 1/00* (2006.01)
*G05D 7/06* (2006.01)
*B01F 3/06* (2006.01)

(52) U.S. Cl.
CPC ........... *F23N 1/005* (2013.01); *G05D 7/0605* (2013.01); *G05D 7/0611* (2013.01); *F23K 2203/008* (2013.01); *F23K 2900/05001* (2013.01); *F23N 2225/00* (2020.01); *F23N 2237/04* (2020.01); *F23N 2239/02* (2020.01)

(58) Field of Classification Search
CPC .. F23N 2237/00; F23K 3/02; F23K 2203/008; F23K 2900/05001; G05D 7/0605; G05D 7/0611; B01F 23/02; B01F 23/30; B65G 47/44
USPC ................ 431/89, 12; 110/186, 347, 101 R; 222/600, 559; 251/326
See application file for complete search history.

(56) References Cited

FOREIGN PATENT DOCUMENTS

| | | |
|---|---|---|
| CN | 103822224 A | 5/2014 |
| CN | 104864403 A | 8/2015 |
| CN | 204756981 U | 11/2015 |
| CN | 107906556 A | 4/2018 |
| CN | 109737448 A | 5/2019 |
| CN | 210165419 U | 3/2020 |
| WO | WO-2013106727 A1 | 7/2013 |

ONLINE PULVERIZED COAL CONCENTRATION REGULATOR AND REGULATING METHOD

TECHNICAL FIELD

The present invention relates to a pulverized coal concentration regulator, and more particularly, to an online pulverized coal concentration regulator and a method for regulating a pulverized coal concentration.

BACKGROUND ART

When a boiler is heated by coal combustion, it is often necessary to grind coal into pulverized coal through a coal mill, and the purpose is to fully burn the coal, thus reducing an amount of harmful waste gas produced by insufficient combustion and increasing an energy utilization rate; and when the pulverized coal is blown into a combustion chamber, there should be not a large difference in concentrations of the pulverized coal blown from all directions, which is easy to lead to uneven heating, local overheating, or insufficient local heat.

A traditional pulverized coal regulator cannot implement real-time online regulation, and the pulverized coal concentration difference can only reach about 30% under optimal control; and secondly, the traditional pulverized coal regulator is easy to cause accumulation of pulverized coal.

SUMMARY OF THE INVENTION

The present invention is completely different from a traditional pulverized coal regulator in design principle and pulverized coal concentration regulating mode. According to the present invention, a pulverized coal concentration in each pipe may be automatically regulated online and in real time, so that the pulverized coal concentration in each pipe is balanced, and meanwhile, the pulverized coal concentration in each pipe may be ensured to be balanced under a condition that an amount of pulverized coal is changed when a unit load is changed, which leads to a change of the pulverized coal concentration in each pipe.

The objective of the present invention is achieved by the following technical solutions: an online pulverized coal concentration regulator is mounted at a front end of a pulverized coal pipe, a pulverized coal concentration detector and a control system are arranged in the pulverized coal pipe, and an output of the pulverized coal concentration detector is electrically connected with a signal input end of the control system, wherein the online pulverized coal concentration regulator further includes a top plate, a regulating rod, a guider, and a powder baffle plate, wherein:

a mounting hole for fixedly mounting the front end of the pulverized coal pipe and a through hole for the powder baffle plate to penetrate through are arranged in the top plate; a connector is arranged between the regulating rod and the powder baffle plate, and two ends of the connector are movably connected with the regulating rod and the powder baffle plate respectively; the guider is slidably connected with the powder baffle plate, and the guider is fixedly connected with the top plate; and a diversion plate is arranged on the top plate, and the diversion plate is slidably connected with the powder baffle plate.

Preferably, one end of the connector is provided with a sliding shaft, one end of the regulating rod is provided with a shaft hole, and the shaft hole is slidably connected with the sliding shaft; and one end of the powder baffle plate is movably connected with the connector in a hinged mode.

Preferably, the powder baffle plate is provided with a powder baffle groove; and the powder baffle plate is mounted in an inclined mode.

Preferably, the guider includes two guiding wheels and a supporting rod, wheel axles of the guiding wheels are fixedly connected with one end of the supporting rod, and the other end of the supporting rod is fixedly connected with one side of the top plate; and the powder baffle plate is arranged between the two guiding wheels, and the guiding wheels are movably connected with the powder baffle plate.

Preferably, a diversion groove is arranged on the diversion plate; and one end of the diversion plate is movably connected with the other side of the top plate through a hinge.

Preferably, the online pulverized coal concentration regulator further includes an electric actuator, an output shaft of the electric actuator is fixedly connected with the other end of the regulating rod; and the electric actuator is electrically connected with an output end of the control system.

A method for regulating a pulverized coal concentration by the online pulverized coal concentration regulator includes the following steps of:

S11: when a coal intake of the pulverized coal pipe needs to be reduced, controlling, by the control system, the electric actuator of the regulator mounted at the front end of the pulverized coal pipe to make the regulating rod drive the connector to move towards the top plate and make the connector move along the sliding shaft in a small displacement, so that the powder baffle plate moves smoothly along the guider and an opening degree of the powder baffle plate is increased, thus increasing an area of the powder baffle plate capable of blocking pulverized coal and reducing an amount of pulverized coal entering the pulverized coal pipe;

S12: when the coal intake of the pulverized coal pipe needs to be increased, controlling, by the control system, the electric actuator of the regulator mounted at the front end of the pulverized coal pipe to make the regulating rod drive the connector to move far away from the top plate and make the connector move along the sliding shaft in a small displacement, so that the powder baffle plate moves smoothly along the guider and the opening degree of the powder baffle plate is reduced, thus reducing the area of the powder baffle plate capable of blocking the pulverized coal and increasing the amount of pulverized coal entering the pulverized coal pipe;

S2: transmitting, by the pulverized coal concentration detector in each pulverized coal pipe, detected pulverized coal concentration data to the control system, determining, by the control system, a pulverized coal concentration difference between a maximum pulverized coal concentration and a minimum pulverized coal concentration of the pulverized coal pipes, and comparing the pulverized coal concentration difference with a set concentration difference;

S21: if the pulverized coal concentration difference is lower than the set concentration difference, a working condition being in a normal state; and if the pulverized coal concentration difference is higher than the set concentration difference, the working condition being in an abnormal state;

S211: when the working condition in the abnormal state in step S21 occurs, judging whether the regulator mounted in the pulverized coal pipe with the minimum pulverized coal concentration is completely opened or closed: if the opening degree of the powder baffle plate of the regulator is not 0, regulating the regulator to reduce the opening degree of the powder baffle plate, which means to increase the pulverized coal concentration in the pipe, and judging the pulverized coal concentration in each pipe at the same time; and if the pulverized coal concentration in the pipe is still the minimum, continuing to regulate the regulator until the opening degree is 0; and S212: when the opening degree of the pulverized coal pipe with the minimum pulverized coal concentration in S211 is 0, but the pulverized coal concentration difference is still higher than the set concentration difference, performing the step S11 on the pipe with the maximum pulverized coal concentration to reduce the amount of the pulverized coal entering the pulverized coal pipe, in the process of regulating the pulverized coal concentration, judging, by the control system, whether the pulverized coal concentration difference between the maximum concentration and the minimum concentration is lower than the set value all the time, and if the difference is greater than the set value, continuing to regulate; and meanwhile, judging, by the control system, whether the pulverized coal pipe with the maximum concentration is changed, if the pulverized coal pipe with the maximum concentration is changed, instructing, by the control system, to stop regulating the original regulator with the maximum concentration and start regulating the current pulverized coal pipe with the maximum concentration.

The present invention has the following advantages:
1. by using the pulverized coal concentration regulator according to the present invention, the pulverized coal concentration difference may be controlled at about 5%;
2. by using the pulverized coal concentration regulator according to the present invention, the pulverized coal concentration in each pipe may be automatically regulated online in real time, so that the pulverized coal concentration in each pipe is balanced, and meanwhile, the pulverized coal concentration in each pipe may be ensured to be balanced under a condition that an amount of pulverized coal is changed when a unit load is changed, which leads to a change of the pulverized coal concentration in each pipe;
3. in a flowing direction of the pulverized coal, the pulverized coal blocked at an upstream position bypasses the pulverized coal pipe at the back through the diversion plate and smoothly enters a downstream position, which not only reduces a concentration of pulverized coal entering a largest pulverized coal pipe at the back, but also increases a concentration of pulverized coal in other pipes, thus increasing a regulating ability of the regulator; and
4. The powder baffle plate is mounted to be inclined relative to the flowing direction of pulverized coal, which is beneficial for conveying the blocked pulverized coal into the diversion plate, and then smoothly conveying the pulverized coal to the downstream position through the diversion plate.

Figure 1:
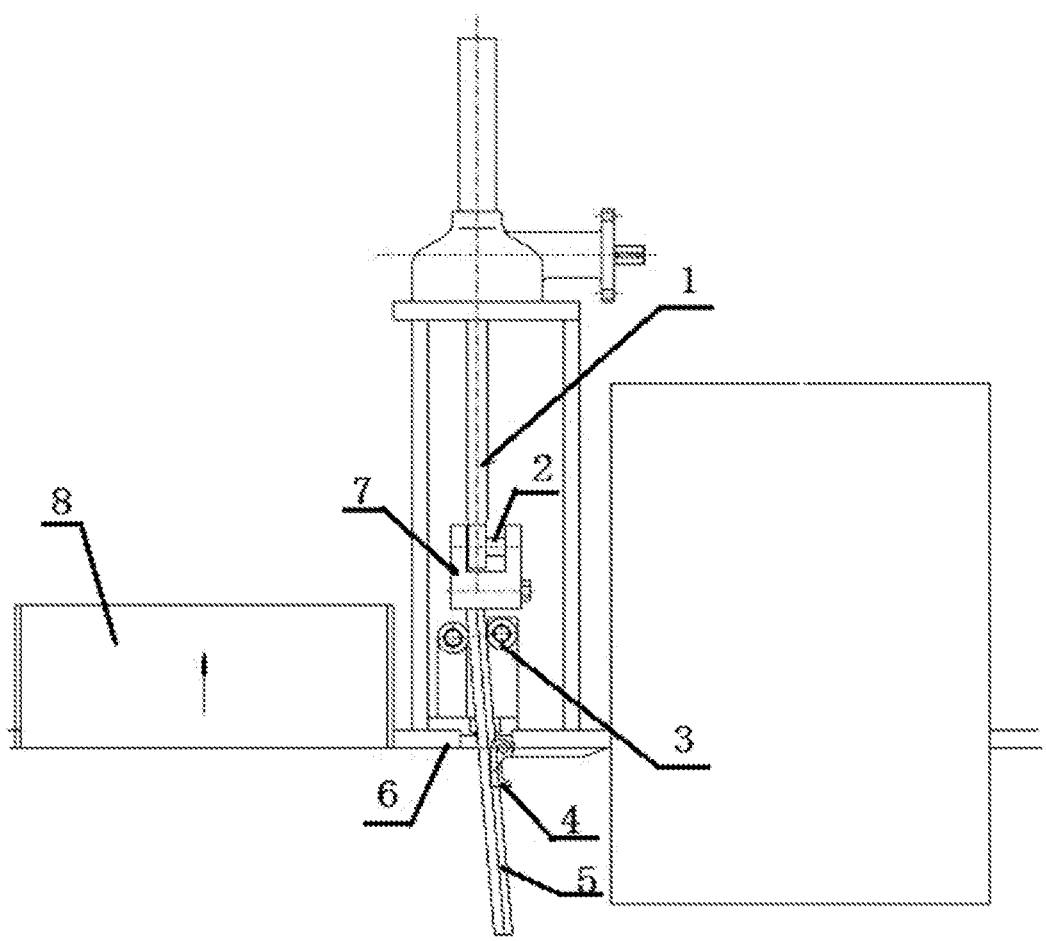
FIG. 1 is a schematic diagram of a full opening degree of a structure of an online pulverized coal concentration regulator.

In the drawings, 1 refers to regulating rod; 2 refers to sliding shaft; 3 refers to guider; 4 refers to diversion plate; 5 refers to powder baffle plate; 6 refers to top plate; 7 refers to connector; and 8 refers to pulverized coal pipe.

DETAILED DESCRIPTION OF THE PREFERRED EMBODIMENTS

The present invention is further described hereinafter with reference to the accompanying drawings, but the scope of protection of the present invention is not limited to the following descriptions.

Figure 2:
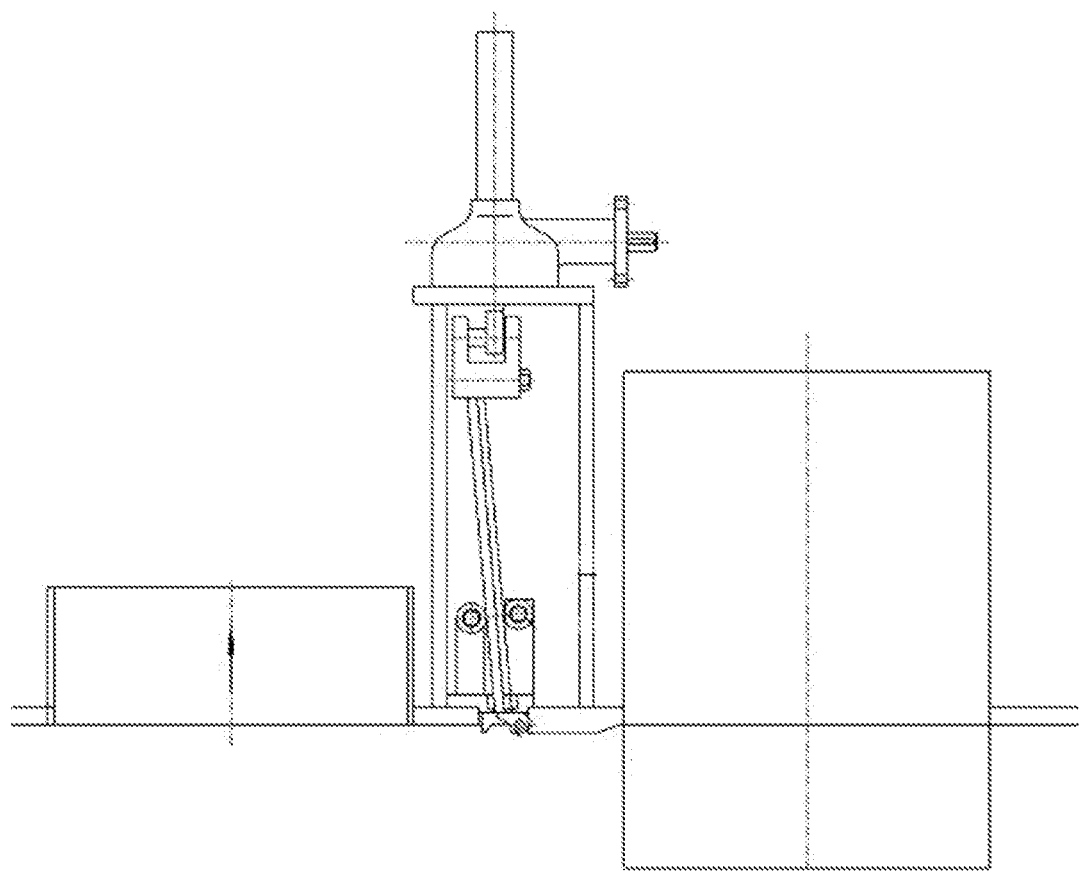
FIG. 2 is a schematic diagram of a zero opening degree of the structure of the online pulverized coal concentration regulator.
Figure 3:
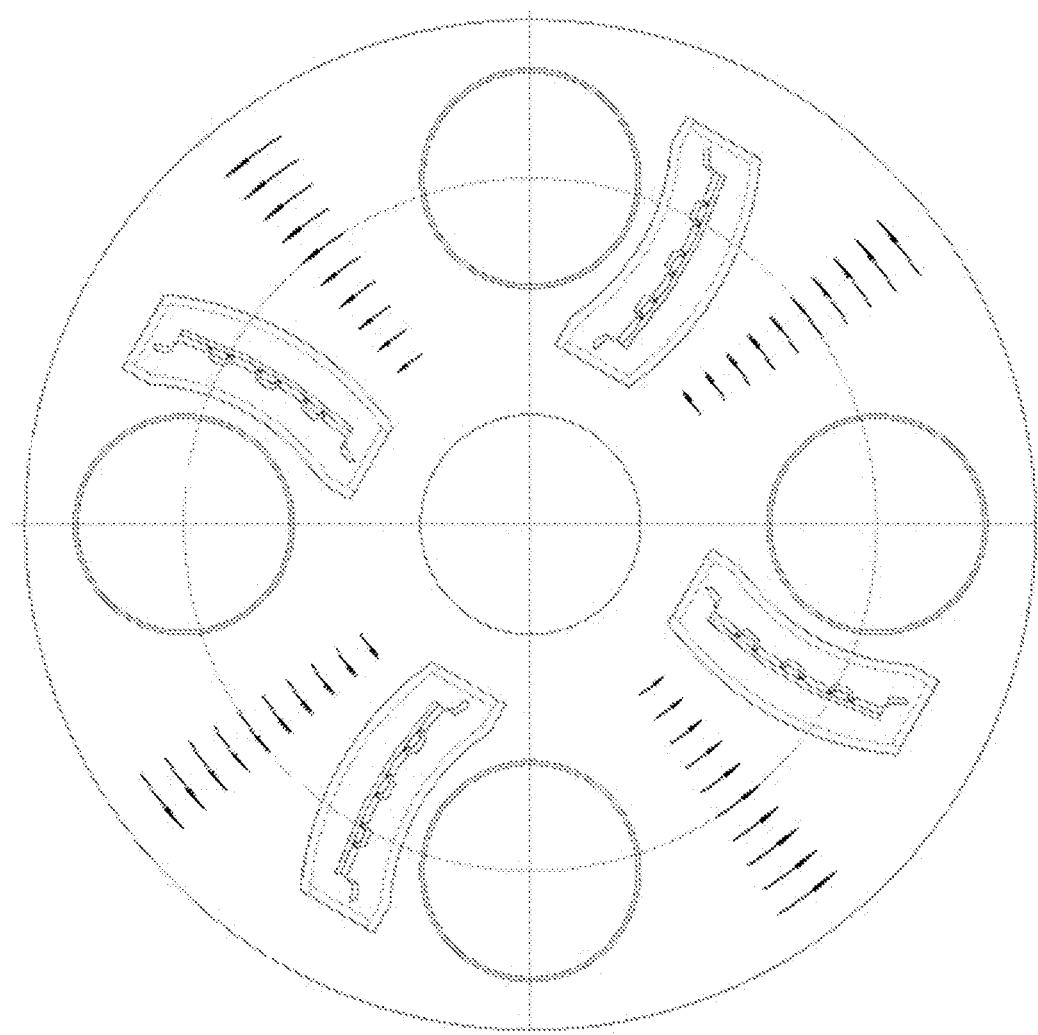
FIG. 3 is a schematic diagram of mounting of the present invention.

As shown in FIG. 1, FIG. 2, and FIG. 3, an online pulverized coal concentration regulator is mounted at a front end of a pulverized coal pipe 8, a pulverized coal concentration detector and a control system are arranged in the pulverized coal pipe 8, and an output of the pulverized coal concentration detector is electrically connected with a signal input end of the control system. The online pulverized coal concentration regulator further includes a top plate 6, a regulating rod 1, a guider 3, and a powder baffle plate 5.

A mounting hole for fixedly mounting the front end of the pulverized coal pipe 8 and a through hole for the powder baffle plate 5 to penetrate through are arranged in the top plate 6. A connector 7 is arranged between the regulating rod 1 and the powder baffle plate 5, and two ends of the connector 7 are movably connected with the regulating rod 1 and the powder baffle plate 5 respectively. The guider 3 is slidably connected with the powder baffle plate 5, and the guider 3 is fixedly connected with the top plate 6. A diversion plate 4 is arranged on the top plate 6, and the diversion plate 4 is slidably connected with the powder baffle plate 5. Pulverized coal blocked at an upstream position smoothly enters a downstream position through the diversion plate 4.

Preferably, one end of the connector 7 is provided with a sliding shaft 2, and an axial direction of the sliding shaft 2 is perpendicular to a movement direction of the regulating rod 1. One end of the regulating rod 1 is provided with a shaft hole, and the shaft hole is slidably connected with the sliding shaft 2. One end of the powder baffle plate 5 is movably connected with the connector 7 in a hinged mode.

Preferably, the powder baffle plate 5 is provided with a powder baffle groove; and the powder baffle plate 5 is mounted in an inclined mode.

Preferably, the guider 3 includes two guiding wheels and a supporting rod, wheel axles of the guiding wheels are fixedly connected with one end of the supporting rod, and the other end of the supporting rod is fixedly connected with one side of the top plate 6. The powder baffle plate 5 is arranged between the two guiding wheels, and the guiding wheels are movably connected with the powder baffle plate 5.

Preferably, a diversion groove is arranged on the diversion plate 4. One end of the diversion plate 4 is movably connected with the other side of the top plate 6 through a hinge, and the diversion plate 4 is always attached to the powder baffle plate 5.

Preferably, the online pulverized coal concentration regulator further includes an electric actuator, and an output shaft of the electric actuator is fixedly connected with the other end of the regulating rod 1. The electric actuator is electrically connected with an output end of the control system.

Preferably, according to actual working conditions, four pulverized coal pipes 8 are provided, and each pulverized coal pipe 8 is provided with the pulverized coal concentration regulator.

A method for regulating a pulverized coal concentration by the online pulverized coal concentration regulator includes the following steps of:

S11: when a coal intake of the pulverized coal pipe 8 needs to be reduced, as shown in FIG. 1, controlling, by the control system, the electric actuator of the regulator mounted at the front end of the pulverized coal pipe 8 to make the regulating rod 1 drive the connector 7 to move towards the top plate 6 and make the connector 7 move along the sliding shaft 2 in a small displacement, so that the powder baffle plate 5 moves smoothly along the guider 3 and an opening degree of the powder baffle plate is increased, thus increasing an area of the powder baffle plate 5 capable of blocking pulverized coal and reducing an amount of pulverized coal entering the pulverized coal pipe 8;

S12: when the coal intake of the pulverized coal pipe 8 needs to be increased, as shown in FIG. 2, controlling, by the control system, the electric actuator of the regulator mounted at the front end of the pulverized coal pipe 8 to make the regulating rod 1 drive the connector 7 to move far away from the top plate 6 and make the connector 7 move along the sliding shaft 2 in a small displacement, so that the powder baffle plate 5 moves smoothly along the guider 3 and the opening degree of the powder baffle plate is reduced, thus reducing the area of the powder baffle plate 5 capable of blocking the pulverized coal and increasing the amount of pulverized coal entering the pulverized coal pipe 8;

S2: transmitting, by the pulverized coal concentration detector in each pulverized coal pipe 8, detected pulverized coal concentration data to the control system, determining, by the control system, a pulverized coal concentration difference between a maximum pulverized coal concentration and a minimum pulverized coal concentration of the pulverized coal pipes 8, and comparing the pulverized coal concentration difference with a set concentration difference;

S21: if the pulverized coal concentration difference is lower than the set concentration difference, a working condition being in a normal state; and if the pulverized coal concentration difference is higher than the set concentration difference, the working condition being in an abnormal state;

S211: when the working condition in the abnormal state in step S21 occurs, judging whether the regulator mounted in the pulverized coal pipe 8 with the minimum pulverized coal concentration is completely opened: if the opening degree of the powder baffle plate 5 of the regulator is not 0, regulating the regulator to reduce the opening degree of the powder baffle plate 5, which means to increase the pulverized coal concentration in the pipe, and judging the pulverized coal concentration in each pipe at the same time; and if the pulverized coal concentration in the pipe is still the minimum, continuing to regulate the regulator until the opening degree is 0; and S212: when the opening degree of the pulverized coal pipe 8 with the minimum pulverized coal concentration in S211 is 0, but the pulverized coal concentration difference is still higher than the set concentration difference, performing the step S11 on the pipe with the maximum pulverized coal concentration to reduce the amount of the pulverized coal entering the pulverized coal pipe 8, in the process of regulating the pulverized coal concentration, judging, by the control system, whether the pulverized coal concentration difference between the maximum concentration and the minimum concentration is lower than the set value all the time, and if the difference is greater than the set value, continuing to regulate; and meanwhile, judging, by the control system, whether the pulverized coal pipe 8 with the maximum concentration is changed, if the pulverized coal pipe 8 with the maximum concentration is changed, instructing, by the control system, to stop regulating the original regulator with the maximum concentration and start regulating the current pulverized coal pipe 8 with the maximum concentration.

The invention claimed is:

1. An online pulverized coal concentration regulator mounted at a front end of a pulverized coal pipe, a pulverized coal concentration detector and a control system being arranged in the pulverized coal pipe, and an output of the pulverized coal concentration detector being electrically connected with a signal input end of the control system, the online pulverized coal concentration regulator comprising a top plate, a regulating rod, a guider, and a powder baffle plate, wherein the top plate includes a mounting hole for fixedly mounting the front end of the pulverized coal pipe and a through hole for the powder baffle plate to penetrate through; a connector is arranged between the regulating rod and the powder baffle plate, and two ends of the connector are movably connected with the regulating rod and the powder baffle plate respectively; the guider is slidably connected with the powder baffle plate, and the guider is fixedly connected with the top plate; and a diversion plate is arranged on the top plate, and the diversion plate is slidably connected with the powder baffle plate.

2. The online pulverized coal concentration regulator according to claim 1, wherein one end of the connector is provided with a sliding shaft, one end of the regulating rod is provided with a shaft hole, and the shaft hole is slidably connected with the sliding shaft; and one end of the powder baffle plate is movably connected with the connector in a hinged mode.

3. The online pulverized coal concentration regulator according to claim 1, wherein the guider comprises two guiding wheels and a supporting rod, wheel axles of the guiding wheels are fixedly connected with one end of the supporting rod, and the other end of the supporting rod is fixedly connected with one side of the top plate; and the powder baffle plate is arranged between the two guiding wheels, and the guiding wheels are movably connected with the powder baffle plate.

4. The online pulverized coal concentration regulator according to claim 1, wherein a diversion groove is arranged on the diversion plate; and one end of the diversion plate is movably connected with the other side of the top plate through a hinge.

5. The online pulverized coal concentration regulator according to claim 1, further comprising an electric actuator, an output shaft of the electric actuator is fixedly connected with the other end of the regulating rod; and the electric actuator is electrically connected with an output end of the control system.

6. A method for regulating a pulverized coal concentration by the online pulverized coal concentration regulator according to claim 1, comprising the following steps of:

S11: when a coal intake of the pulverized coal pipe needs to be reduced, controlling, by the control system, the electric actuator of the regulator mounted at the front end of the pulverized coal pipe to make the regulating rod drive the connector to move towards the top plate and make the connector move along the sliding shaft in a displacement, so that the powder baffle plate moves smoothly along the guider and an opening degree of the powder baffle plate is increased, thus increasing an area of the powder baffle plate capable of blocking pulverized coal and reducing an amount of pulverized coal entering the pulverized coal pipe;

S12: when the coal intake of the pulverized coal pipe needs to be increased, controlling, by the control system, the electric actuator of the regulator mounted at the front end of the pulverized coal pipe to make the regulating rod drive the connector to move away from the top plate and make the connector move along the sliding shaft in a displacement, so that the powder baffle plate moves smoothly along the guider and the opening degree of the powder baffle plate is reduced, thus reducing the area of the powder baffle plate capable of blocking the pulverized coal and increasing the amount of pulverized coal entering the pulverized coal pipe;

S2: transmitting, by the pulverized coal concentration detector in the pulverized coal pipe, detected pulverized coal concentration data to the control system, determining, by the control system, a pulverized coal concentration difference between a maximum pulverized coal concentration and a minimum pulverized coal concentration of the pulverized coal pipe, and comparing the pulverized coal concentration difference with a set concentration difference;

S21: if the pulverized coal concentration difference is lower than the set concentration difference, a working condition is in a normal state; and if the pulverized coal concentration difference is higher than the set concentration difference, the working condition is in an abnormal state;

S211: when the working condition in the abnormal state in step S21 occurs, judging whether the regulator mounted in the pulverized coal pipe with the minimum pulverized coal concentration is completely opened: if the opening degree of the powder baffle plate of the regulator is not 0, regulating the regulator to reduce the opening degree of the powder baffle plate, thereby increasing the pulverized coal concentration in the pulverized coal pipe, and judging the pulverized coal concentration in the pulverized coal pipe at the same time; and if the pulverized coal concentration in the pulverized coal pipe is still the minimum, continuing to regulate the regulator until the opening degree is 0; and S212: when the opening degree of the pulverized coal pipe with the minimum pulverized coal concentration in S211 is 0, but the pulverized coal concentration difference is still higher than the set concentration difference, performing the step S11 on the pulverized coal pipe with the maximum pulverized coal concentration to reduce the amount of the pulverized coal entering the pulverized coal pipe, in the process of regulating the pulverized coal concentration, judging, by the control system, whether the difference between the maximum concentration and the minimum concentration is lower than the set value all the time, and if the difference is greater than the set value, continuing to regulate; and meanwhile, judging, by the control system, whether the pulverized coal pipe with the maximum concentration is changed, if the pulverized coal pipe with the maximum concentration is changed, instructing, by the control system, to stop regulating the original regulator with the maximum concentration and start regulating the current pulverized coal pipe with the maximum concentration.

* * * * *